(12) United States Patent
Robert

(10) Patent No.: US 8,798,314 B2
(45) Date of Patent: Aug. 5, 2014

(54) DETECTION OF VEHICLES IN IMAGES OF A NIGHT TIME SCENE

(75) Inventor: Kostia Robert, Kensington (AU)

(73) Assignee: National ICT Australia Limited, Eveleigh, New South Wales (AU)

( * ) Notice: Subject to any disclaimer, the term of this patent is extended or adjusted under 35 U.S.C. 154(b) by 524 days.

(21) Appl. No.: 13/002,932

(22) PCT Filed: Jul. 13, 2009

(86) PCT No.: PCT/AU2009/000895
§ 371 (c)(1),
(2), (4) Date: Mar. 28, 2011

(87) PCT Pub. No.: WO2010/006361
PCT Pub. Date: Jan. 21, 2010

(65) Prior Publication Data
US 2011/0164789 A1    Jul. 7, 2011

(30) Foreign Application Priority Data
Jul. 14, 2008 (AU) ................................ 2008903591

(51) Int. Cl.
*G06K 9/00* (2006.01)
*G06K 9/46* (2006.01)

(52) U.S. Cl.
CPC .......... *G06K 9/00798* (2013.01); *G06K 9/4604* (2013.01)
USPC ......................................................... 382/103

(58) Field of Classification Search
USPC ......................................................... 382/103
See application file for complete search history.

(56) References Cited

U.S. PATENT DOCUMENTS

| 5,910,817 | A | * | 6/1999 | Ohashi et al. ................. 348/159 |
| 7,460,691 | B2 | * | 12/2008 | Ng et al. ........................ 382/107 |
| 7,512,252 | B2 | * | 3/2009 | Otsuka et al. ................. 382/104 |
| 8,254,688 | B2 | * | 8/2012 | Mizuno et al. ................. 382/190 |
| 2005/0058323 | A1 | | 3/2005 | Brodsky |
| 2007/0263901 | A1 | | 11/2007 | Wu et al. |
| 2008/0024325 | A1 | | 1/2008 | Kobayashi et al. |
| 2008/0062010 | A1 | | 3/2008 | Kobayashi et al. |
| 2008/0158014 | A1 | | 7/2008 | Zou et al. |
| 2010/0322476 | A1 | * | 12/2010 | Kanhere et al. ............... 382/103 |

FOREIGN PATENT DOCUMENTS

WO    WO 01/33503    5/2001

OTHER PUBLICATIONS

R. Taktak et al., Road Modelling and Vehicle Detection by Using Image Processing, France, IEEE, 0-7803-2129-4/94, 1994, pp. 2154-2158.

R. Cucchiara et al., Vehicle Detection Under Day and Night Illumination, Proc. of ISCS-IIA99, 7 pages.

(Continued)

*Primary Examiner* — Tom Y Lu

(57) ABSTRACT

The invention concerns the detection of vehicles in images of a night time scene. In particular, but not limited to, the invention concerns a traffic surveillance system that is used to detect and track vehicles to determine information about the detected and tracked vehicles. Candidate pair of headlights are identified 900 in an image based on luminance of points in the image. These candidates are then verified 902 by identifying 400*i* a sub-image of the image sized to include a candidate vehicle having the pair of candidate headlights; and determining whether the candidate vehicle is a vehicle represented in the image by testing 400*k* the sub-image for the presence of predetermined features of a vehicle other than the headlights. Aspects of the invention include a method, software and computer hardware.

20 Claims, 11 Drawing Sheets

(56) References Cited

OTHER PUBLICATIONS

K. Robert, Night-Time Traffic Surveillance A Robust Framework for Multi-Vehicle Detection, Classification and Tracking, NICTA, The University of New South Wales, Sydney, Australia 8 pages, 2009.

PCT International Search Report and Written Opinion of the International Searching Authority, Application No. PCT/AU2009/000895, Australian Patent Office, Sep. 2009, 9 pages.

Matthew Turk et al, "Eigenfaces for Recognition", Journal of Cognitive Neuroscience, vol. 3, No. 1, 1991, pp. 71-86.

R. Taktak et al, "Vehicle Detection at Night Using Image Processing and Pattern Recognition", Image Processing, 1194, Proceedings, ICIP-94, IEEE International Conference, vol. 2, Nov. 1994, pp. 296-300.

Rita Cucchiara et al, "Image Analysis and Rule-Based Reasoning for a Traffic Monitoring System", IEEE Transactions on Intelligent Transportation Systems, vol. 1, No. 2, Jun. 2000, pp. 119-130.

D.J. Dailey et al, "CCTV Technical Report—Phase 3", Washington State Department of Transportation Center (TRAC), Jan. 2006.

\* cited by examiner

DETECTION OF VEHICLES IN IMAGES OF A NIGHT TIME SCENE

TECHNICAL FIELD

The invention concerns the detection of vehicles representing in images of a night time scene. In particular, but not limited to, the invention concerns a traffic surveillance system that is used to detect and track vehicles in a time ordered sequence of images taken in the night time to determine information about the detected and tracked vehicles. Aspects of the invention include a method, software and traffic surveillance system.

BACKGROUND ART

Traffic data extraction is in increasing demand for applications such as traffic light control, population evacuation, and for reducing the impact of traffic, including congestion, pollution, delays and accidents.

Magnetic loop technology is widely used for extracting traffic data from a road. The loop detectors are buried underneath the road to provide real-time statistics. These loops are however expensive, cause traffic stoppages for installation, and they are only able to provide data on the presence of a vehicle.

The use of fixed video cameras is more promising as cameras are able to extract a larger range of traffic data. Advanced traffic management systems use computer vision techniques to automatically process the images of the camera's field of view (FOV) and extract traffic data such as vehicle counting, congestion detection, speed estimation of the vehicles and queue length estimation.

Although use of computer vision in traffic surveillance systems is an active research area, current research focuses mainly on algorithms designed for day time conditions.

An efficient but expensive technique to detect vehicles in the night time is to use night vision sensors, such as infrared-thermal cameras. These cameras provide greyscale images where each pixel gives information about the temperature of the object it represents. Unfortunately, the use of infrared sensors in traffic surveillance systems is often prohibitively costly.

Usually, it is more affordable to use common video charged-coupled device (CCD) or a complementary metal-oxide semiconductor (CMOS), camera however CCD and CMOS cameras are more prone to capturing noise in images taken in the night time.

SUMMARY OF THE INVENTION

In one aspect the invention provides a method of detecting a vehicle represented in an image of a night time scene, the method comprising the steps of:
(a) identifying a candidate pair of headlights in an image based on luminance of points in the image;
(b) identifying a sub-image of the image sized to include a candidate vehicle having the pair of candidate headlights; and
(c) determining whether the candidate vehicle is a vehicle represented in the image by testing the sub-image for the presence of a predetermined feature of a vehicle other than the headlights.

Luminance as used here is understood to mean by a person skilled in the art as being related to brightness and intensity.

Methods used for detecting vehicles in images of day time scenes, such as background subtraction, are not suitable for use on images of night time scenes. This is because the light sensitivity and contrast of the camera capturing the images is often too weak. Further the moving reflections and specularities of head lights as captured in images of night time scenes will produce a lot of ambiguities in the image making the vehicle difficult to detect.

Step (a) encourages a low rate of false-negative candidates but may result in the identification of false-positive candidates. It is an advantage of the invention that since further analysis is performed in steps (b) and (c) to verify that the pair of candidate headlights has associated with it in the image a further feature that will comprise a vehicle. This verification step helps to reduce the number of false positives of detected vehicles in the image. This is especially important in images of night scenes where the reflection of the headlights are often erroneously identified as being a pair of headlights that lead to false positives.

Once a vehicle is detected, further traffic data about the vehicle can then be extracted from the image.

The step of identifying a pair of candidate headlights may comprise identifying a mass of points in the image as including a candidate headlight. The points of the mass may have predetermined luminance values, wherein the luminance values are based on the ratio of Value on Saturation of points in the area of the mass.

The step of identifying a candidate pair of headlights in an image may comprise disqualifying a mass of points as including a candidate headlight where the mass is smaller than a predetermined size. The predetermined size may be a size range and may be based on the position of mass in the image to take account the perspective effect in the image. This may be performed by a white top hat transformation.

The method may further comprise performing opening and closing morphological operations on a plurality of masses of points identified in the image.

The method may further comprise estimating a location of a candidate headlight in a mass. If the mass is of a predetermined expected size (i.e. normal area size), the location of the candidate headlight in the mass may be the approximate centre of the mass.

If the mass is larger than a predetermined expected size (i.e. the normal area size) and is essentially circular in shape, the location of the candidate headlight in the mass may be the approximate centre of the mass.

The method may comprise locating a candidate headlight at approximately the centre of a mass when ultimately eroded.

For each location of a candidate headlight, the method further comprises the step of searching for a substantially laterally aligned location of a further candidate headlight to form a pair of candidate headlights. For each location of a candidate headlight, the method further comprises the step of searching for a further candidate headlight that is substantially a predetermined distance from the candidate headlight to form a pair of candidate headlights. Multiple predetermined distances may be used in the above step, wherein each distance is related to a vehicle type that can later be used in classifying the detected vehicle.

If the mass is larger than a predetermined size (i.e. the normal size), the method further comprises the step of estimating the location of two candidate headlights to form a pair of candidate headlights, the two locations may be the most separated possible locations within the mass that are laterally aligned. This step may further comprise locating two pairs of candidate headlights at the opposite ends (i.e. top and bottom) of the mass.

It is an advantage of at least one embodiment of the present invention that the step of identifying the pair of candidate headlights is aimed at ensuring that no real pairs of headlights are missed. This is especially important when the night time scene is lighted by road-side lamps where headlights might be confused with white or light-coloured vehicles.

The sub-image may substantially include only the candidate vehicle and may be substantially square. The size of the sub-image may be based on the position and length between the pair of candidate headlights. The method may further comprise the step of scaling the sub-image to a predetermined size and then performing histogram remapping methods.

The step of determining whether the candidate vehicle is a vehicle may comprise the use of machine learning techniques.

The predetermined feature may be one or more features and may be features other than the headlights only. The predetermined features may be part of the vehicle, such as a windscreen. The predetermined feature may be an effect represented in the image due to the presence of the vehicle, such as a shadow cast by the vehicle. Testing the sub-image for the presence of the predetermined feature may comprise determining whether the predetermined feature is in a predetermined spatial relationship with the candidate headlights, that is the spatial relationship common to most vehicles. This testing may comprise the use of an image mask that outlines the predetermined feature. The step of testing the sub-image for the presence of the predetermined feature may comprise applying the mask to the sub-image to confirm that points having a predetermined characteristic (i.e. are dark) are located in the sub-image within the outline of the predetermined feature of the mask. It is an advantage of this test that true positives of vehicle candidate are detected and false positives are disqualified.

The method of step (c) may further comprise:
  determining one or more descriptors to represent a sub-image (i.e. vehicle frontal appearance); and
  testing the one or more descriptors on a trained classifier to determine whether the candidate vehicle of the sub-image is a vehicle represented in the image and may further classify the classify the vehicle (see below).

The image of the night time scene may be one image in a time ordered sequence of images of the night time scene, such as a video. The method may be performed on each image of the sequence.

The method further comprises matching the detected vehicle in subsequent images in the sequence (i.e. tracking).

The method may further comprise the step of classifying the detected vehicle. This may comprise determining the distance between the headlights of the identified pair of headlights of the detected vehicle. This may be used to classify the detected vehicle as either a car or a heavy vehicle.

Classifying the detected vehicle may comprise:
  determining one or more descriptors to represent a sub-image; and
  testing the one or more descriptors on a trained classifier to classify the vehicle using machine learning techniques.

The machine learning techniques may be a Neural Network, a Support Vector Machine, or a boosting technique. The classifier is trained by multiple sub-images that each represent one or more particular vehicles of a classification in a night time scene.

The method may further comprise the initial step of identifying lanes in the image, and performing the method on the area of the image bounded by a vertical distance in the image above the identified lane. The method may further comprise the step of extracting traffic information about the detected vehicle from the image or sequence of images.

The method may comprise the step of translating all points in an image from image coordinate values to a real world values, and using the real world values in the method.

The scene may include a road having multiple lanes. The scene may be of an unlit or lighted road. The night time may be where there is a limited amount of day light. The point may be one or more pixels.

The camera may be a charged-coupled device camera (CCD) or a complementary metal-oxide semiconductor (CMOS), and may be low to medium mounted camera.

A further aspect of the invention includes software, this is computer readable instructions recorded on a computer readable media, that when executed by a computer causes the computer to perform the method described above.

In yet a further aspect the invention is computer hardware for detecting a vehicle represented in an image of a night time scene, the computer comprising:
  input means to receive the image of the night time scene;
  a processor to (a) identify a candidate pair of headlights in the image based on luminance of points in the image, (b) identify a sub-image of the image sized to include a candidate vehicle having the pair of candidate headlights, and (c) to determine whether the candidate vehicle is a vehicle represented in the image by testing the sub-image for the presence of predetermined features of a vehicle other than the headlights; and
  output means to indicate whether a vehicle has been detected in the image.

The computer may be part of or in communication with a traffic surveillance computer system. The invention may be an embedded system.

BRIEF DESCRIPTION OF THE DRAWINGS

An example of the invention will now be described with reference to the following drawings, in which.

BEST MODES OF THE INVENTION

Figure 11:
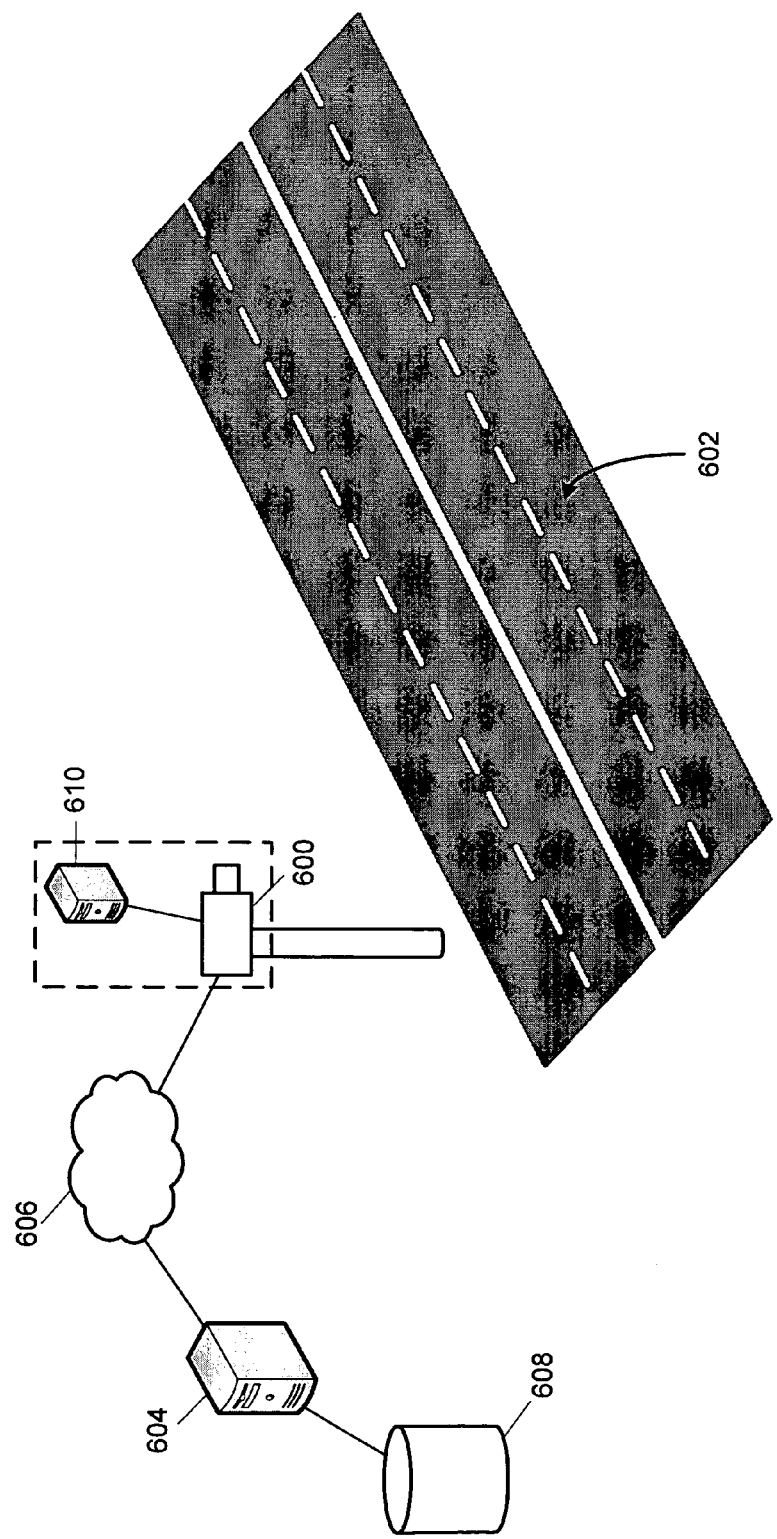
FIG. 11 is a pictorial view of the traffic surveillance system of the example.

The following is a description of a computer vision traffic surveillance system. As shown in FIG. 11 the system comprises a CCD camera 600 that captures a video of a traffic scene 602 having multiple lanes of vehicle traffic in both the day and night time. The video is comprised of a time ordered sequence of images.

Figure 3:
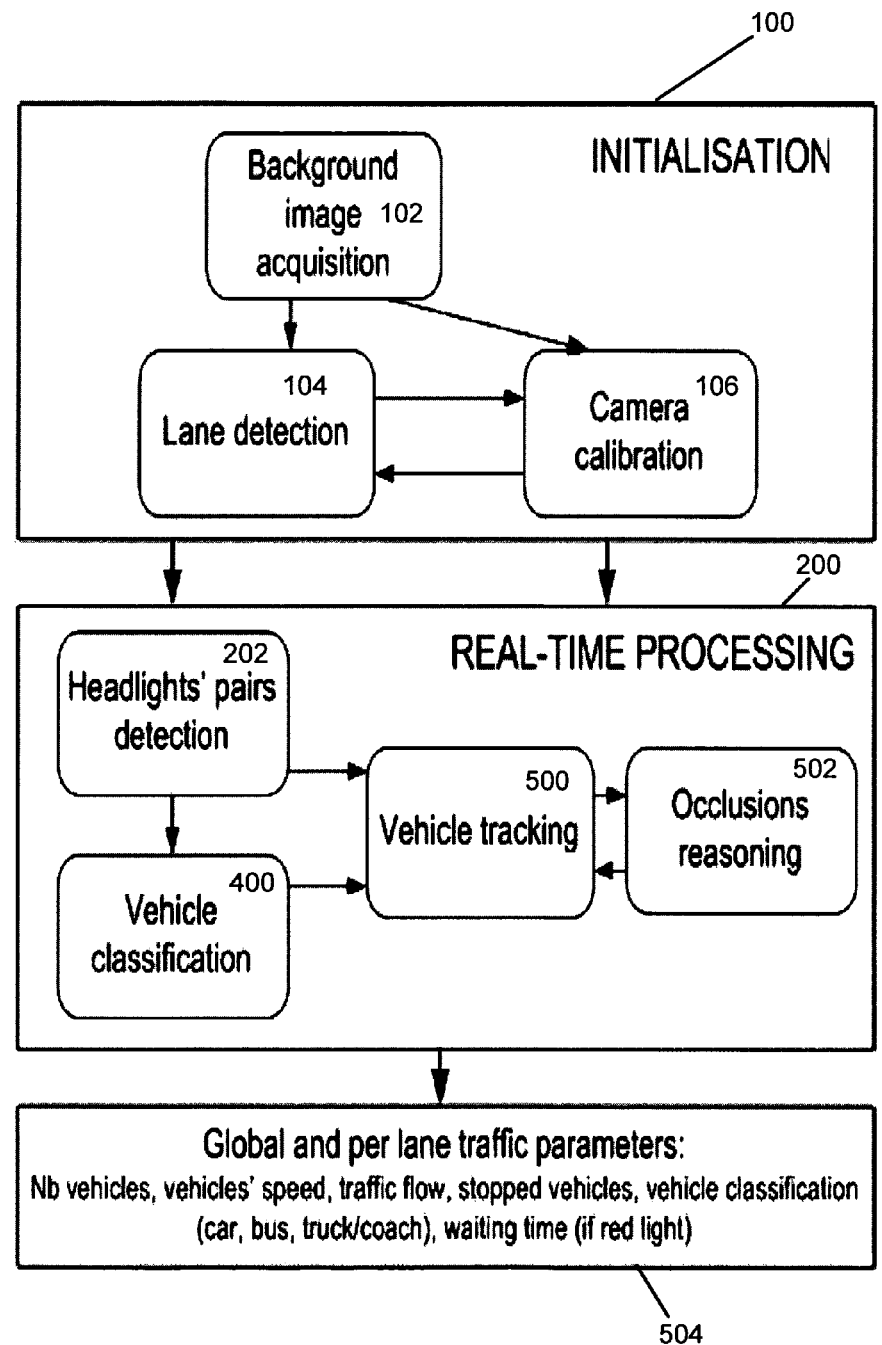
FIG. 3 is a flowchart of this example of processing the images of a night time scene.

The camera 600 is connected to a computer 604 via the internet 606 or any other suitable computer network. Using the computer network, the images captured by the camera 600 are received by the computer 604 at an input port (i.e. the internet connection) and stored in an associated datastore 608. These images can be processed by the processor of the computer 300 in real-time or off line to detect vehicles in the images and then extract further traffic data concerning the traffic in the captured images. The result of this process is provided as output, such as sent to a further hardware device or displayed on a screen. An example of the method of processing these images will now be described in further detail and with reference to FIG. 3.

Figure 1B:
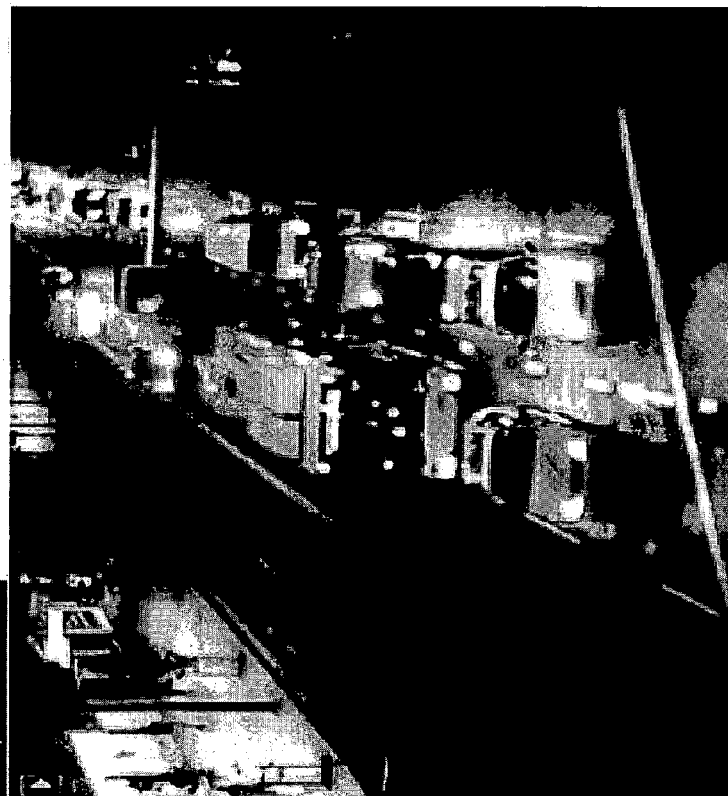
FIG. 1(a) and FIG. 1(b) are two sample images of a night time scene.
Figure 1A:
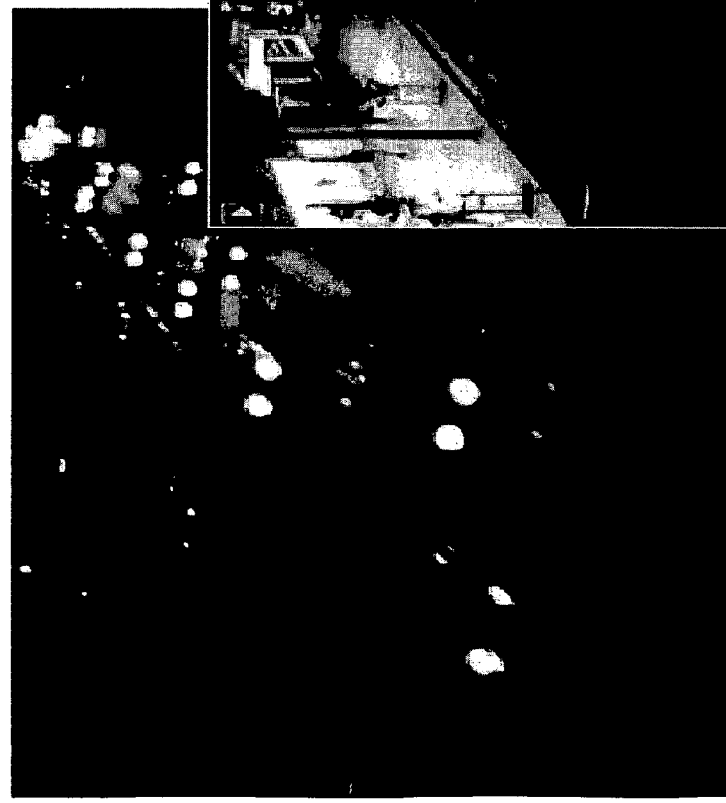

Unlike a thermal camera, the camera 600 is sensitive to visible light. We identify here two kinds of night time road scenes that can be captured by CCD cameras:

1. Unlit Roads.
   An example is shown in FIG. 1(a). In these scenes, there are no public light poles that illuminate the road. In these images, headlights of vehicles, their reflections, and sometimes the road markings are visible. The headlights appear as a round bright blob with good contrast against their surroundings.
2. Lighted Roads.
   An example is shown in FIG. 1(b). In these scenes, the road is illuminated by public light poles. In addition to what is visible in unlit roads, the public lights reveal all the scene to the camera (i.e. the background, the vehicles, and the pedestrians). The contrast between headlights and their surround is not very clear, especially for light-coloured or white vehicles.

The traffic surveillance system of this example aims to detect vehicles in both types of night time road scenes without any changes made to the camera 600, such as exposure. The camera can be set to have low exposure, such that only the lights are visible in the images. Or the exposure can be set so that all objects are visible. The example described here can handle both cases. In the latter case, the headlights are less contrasted with their surround, but the vehicles and other objects are still visible making the images captured also suitable for use with other detection algorithms, such as incident detection, pedestrian detection, etc. In this way the traffic surveillance system of this example can use cameras already installed for detection during day time scenes. This example does not require the installation of a specific cameras.

In the captured images of night time scenes, headlights are a strong and consistent feature that can be used to detect vehicles. The main difficulty is to separate the headlights from their beams. Since the motion vectors of the headlights and the beams are similar, motion cannot be used to discriminate between them. The reflections of headlights on the ground appear very bright on the camera, which will confuse a brightness-based headlight detector.

Moreover, the headlights produce specularities on other vehicles. We can see the highlights on the windows of the vehicles in FIG. 1(a) and FIG. 1(b). The bright lane markings can confuse a headlight detector as well. Further difficulty is when two headlights merge, especially if they belong to a white vehicle (top and bottom of FIG. 1(b)).

Initialisation 100

The initialization 100 of the traffic surveillance system is performed offline and is specific to the video camera. To begin, we need a clear image 102 of the background of the scene. Many known methods can achieve this including using snapshot, average/median/inpainting-based background image or using advanced background modelling techniques. Once the background image is available, the lane markings are manually or semi-automatically detected 104 in order to separate each lane of interest in the image. A lane separation can be represented as a succession of image points.

Figure 2:
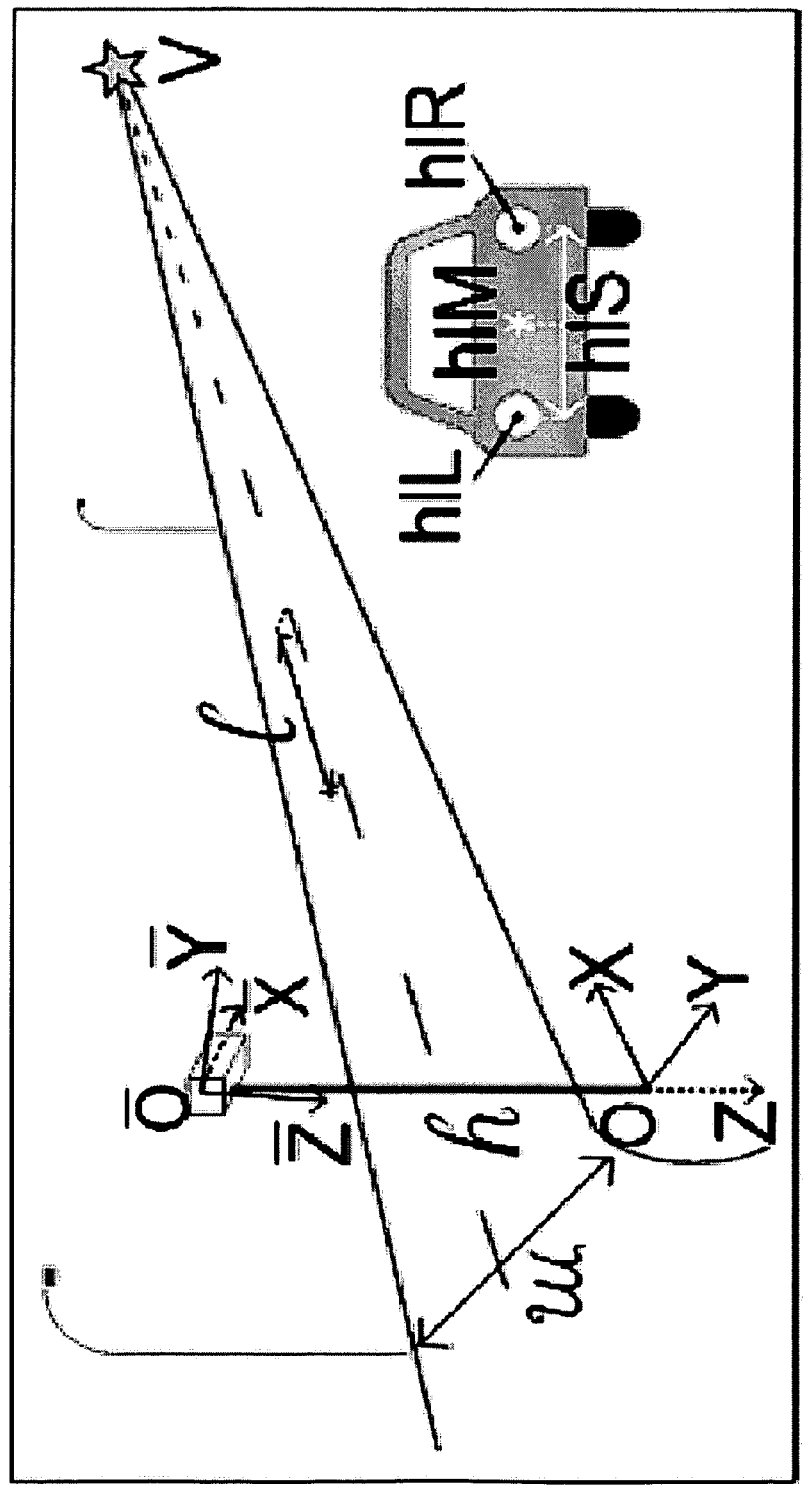
FIG. 2 is a geometric model of a scene.

A coarse camera calibration is then performed 106 to establish projection equations between world measurements and image geometry. These equations will be useful for headlight detection, vehicle speed estimation, and vehicle classification. The ground plane constraint is a widely used assumption for calibrating outdoor scenes. In addition, the roads are generally assumed to be straight. The calibration process of this example requires a vanishing point and two ground truth measures in the world scene to compute the camera's parameters. The period of the broken lane markings and the horizontal width of the lanes constitute the ground truth measures. Since road use standards for these measures, this avoids the need to go directly into the field to measure them out. FIG. 2 shows the camera coordinate system ($\bar{O}$, $\bar{X}$, $\bar{Y}$, $\bar{Z}$), and road (or world) coordinate system (O,X,Y,Z), as well as the two ground truth measures l and w. The camera and road coordinates for a point are related by the following, invertible, affine transformations:

$$X = R\bar{X} + T, \bar{X} = R(X - T), \qquad (1)$$

where $$R = \begin{pmatrix} r_{11} & r_{12} & r_{13} \\ r_{21} & r_{22} & r_{23} \\ r_{31} & r_{32} & r_{33} \end{pmatrix}, T = \begin{pmatrix} 0 \\ 0 \\ -h \end{pmatrix} \qquad (2)$$

R is a rotation matrix, T is the translation vector between the two coordinates systems, h is the perpendicular height of the camera above the road. We assume no camera roll. Hence, the Y-axis is parallel to $\bar{Y}$-axis, and the rotation matrix has only two degrees of freedom.

The relationship between the image coordinate system (o,x,y) and the camera coordinate system ($\bar{O}$, $\bar{X}$, $\bar{Y}$, $\bar{Z}$) is given by:

$$x = f\frac{\bar{Y}}{\bar{X}}, y = f\frac{\bar{Z}}{\bar{X}}, \qquad (3)$$

where f is the focal length in pixel units. The actual point (e.g. single pixel) coordinates (u, v) are defined with respect to an origin in the top left hand corner of the image plane, and will satisfy:

$$u = u_0 + x, v = v_0 + y \qquad (4)$$

The computation of the external parameters (i.e. the two rotation angles and the height of the camera) and the internal parameters (f, $u_0$, $v_0$) can be performed using various methods such as calibration methods disclosed in Dailey and Cathey [2].

Knowing the distance Z of a 3D point above the road plane and knowing its image coordinates (x,y) we can infer its two missing 3D coordinates X and Y by the following perspective equations:

$$X = (h-Z)\frac{r_{11}f + r_{12}x + r_{13}y}{a_{31}f + a_{32}x + a_{33}y} \quad (5)$$

$$Y = (h-Z)\frac{r_{21}f + r_{22}x + r_{23}y}{a_{31}f + a_{32}x + a_{33}y} \quad (6)$$

The translation of a 3D point is a translation in the 2D image plane can be expressed by a homography. Using the above equations, the homography H is a multiplication of matrices:
where $(x_1, y_1)$ is the 2D coordinates of the point before its 3D translation. The 2D coordinates of that point after the translation are $(x_2, y_2)$. The 3D translation is expressed by a vector of three translations along each axis of the road coordinate system (tx,ty,tz).

$$H(X, tx, ty, tz) = \begin{pmatrix} 0 & f & 0 & 0 \\ 0 & 0 & f & 0 \\ 1 & 0 & 0 & 0 \end{pmatrix} \cdot \begin{pmatrix} r_{11} & r_{21} & r_{31} & 0 \\ r_{12} & r_{22} & r_{32} & 0 \\ r_{13} & r_{23} & r_{33} & h \\ 0 & 0 & 0 & 1 \end{pmatrix} \cdot \begin{pmatrix} 1 & 0 & 0 & tx \\ 0 & 1 & 0 & ty \\ 0 & 0 & 1 & tz \\ 0 & 0 & 0 & 1 \end{pmatrix} \quad (7)$$

$$\begin{pmatrix} r_{11} & r_{21} & r_{31} & 0 \\ r_{12} & r_{22} & r_{32} & 0 \\ r_{13} & r_{23} & r_{33} & -h \\ 0 & 0 & 0 & 1 \end{pmatrix} \cdot \begin{pmatrix} 0 & 0 & f(h-Z) \\ (h-Z) & 0 & 0 \\ 0 & (h-Z) & 0 \\ r_{32} & r_{33} & r_{31}f \end{pmatrix}$$

$$\begin{pmatrix} \lambda x_2 \\ \lambda y_2 \\ \lambda \end{pmatrix} = H \begin{pmatrix} x_1 \\ y_1 \\ 1 \end{pmatrix}, \quad (8)$$

Now that we have set the transformation equations, we will prepare some geometry-based data for the real-time processing. To begin, the lanes' boundaries are raised at the height of a typical headlight (say Z=0.7 m). These new lane boundaries provide the delimitation of the regions of interest, where we will look for headlights. They are also used to know in which lane the detected vehicle is positioned in and, thus allows the calculation of traffic parameters per lane. All real-time low-level treatments will be only applied on the pixels inside these regions of interest.

Due to the perspective effect, the headlights have a big area on the image when they are closer to the camera (lower part of the image) and a small area farther from the camera (top of the image). Neither a small bright blob in the lower part of the image, nor a large bright blob near the top of the image can correspond to a headlight. Hence, we need to have an idea of a typical headlight dimension for each position in the image. A typical headlight (assumed to be a disk of 20 cm diameter) is projected at various positions in the image coordinate. The pixel diameter is retrieved with the help of the homography H (0.7, 0, 0.2, 0). Likewise, the distance between two headlights of a same vehicle is presumed to be approximately 1 m for a car and 1.5 m for a heavy vehicle (i.e. bus, truck, coach). We project these meter distances at various positions in the image coordinates to know the corresponding pixel distances. The homographies H (0.7, 0, 1, 0) and H (0.7, 0, 1.5, 0) are used respectively for the width of cars and width of heavy vehicles.

Real-Time Processing 200

The vehicles are individually detected before being matched over frames. This approach is called detect-then-track. Nevertheless, the tracking module can determine if some vehicles have been misdetected, i.e. detection of False Positives and False Negatives.

The proposed vehicle detection approach is separated into two stages in order to be robust and reliable. The first stage generates hypotheses of location and width of vehicles, through the detection of pairs of headlights. The second stage checks the presence of a vehicle behind each hypothesis through a decision tree.

Hypothesis Generation: Headlight Pair Detection 202 and Vehicle Classification 400

Headlights are detected by looking at bright regions (i.e. neighbouring pixels that form a connected blob or mass) in the regions of interest. This can be achieved via morphological operations [4], or via template matching [1]. However these methods do not perform efficiently in practice. Cases that would make such headlight detectors inefficient are shown in FIG. 1 and include, particularly in lighted scenes:

headlights that dazzle the camera and result in a large bright blob (i.e. mass) in the image bright blobs in the image that represent white marking on the road large bright blobs in the image that represent a combination of one or more headlights with a bonnet of a white or light-coloured vehicle bright headlights blobs at the end of the scene that seem stuck because of the perspective effect disturbed lights in the image due to blinkers of vehicles large bright blobs in the image that represent a white car's hood or rooftop small bright blobs due to the actual headlights of the vehicles headlights are incorrectly orientated bright blobs that represent the combination of objects in the image such as headlights, hood or roof of a light coloured car and ground reflections.

Figure 10:
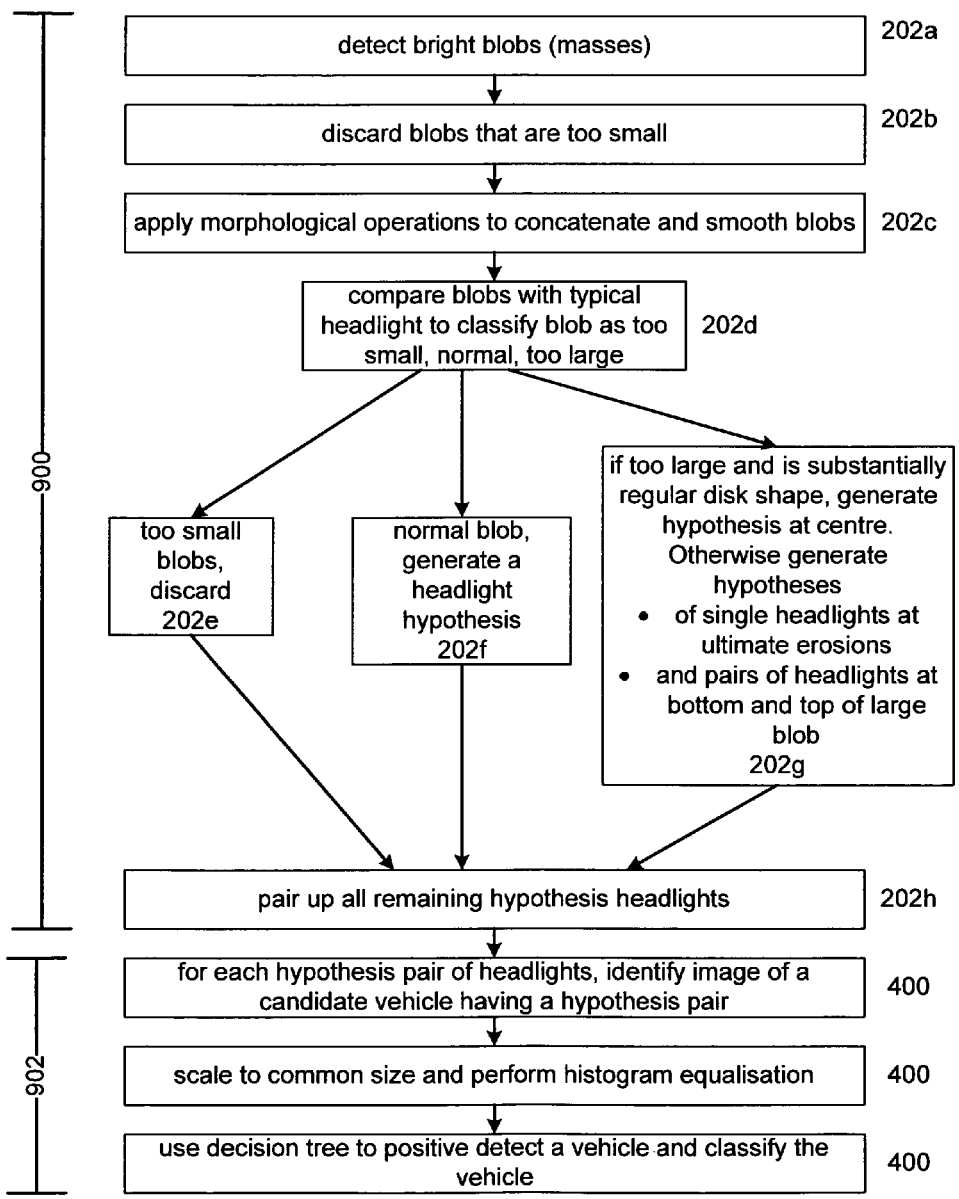
FIG. 10 is a flow chart showing the headlight pair detection and verification method of this example.

To address this, the method of this example consists of two main steps as shown in FIG. 10:

1. First quickly generating many hypotheses of headlights 900 (i.e. candidate headlights). All bright blobs that are not too small, according to a predetermined headlight reference, are assumed to contain at least one headlight. The hypothesis generation phase is thus designed in a way such that no headlights are missed, at the cost of generating some false positives.
2. Then, the hypothesis verification 902 is designed in a way such that false hypotheses are discarded.

This method is more efficient and faster than applying only the verification stage on the whole image at various scales.

To generate headlight hypothesis 900, the bright blobs are detected 202a by looking for connected pixels that maximise the ratio V/S (Value on Saturation). This is simply achieved by the non-linear luminance equation of the colour channels (R,G,B):

$$L = \frac{1}{2}(\text{MAX}(R,G,B) + \text{MIN}(R,G,B)) \quad (9)$$

The luminance image is only computed inside the lanes of interest. It is binarized by a fixed threshold.

A white top hat transform (WTHT) is then performed in order to discard the blobs that are too small 202b to represent a headlight. The structuring element of the WTHT is a disk of a typical headlight diameter. To deal with the scale issue caused by the perspective phenomenon in the image, the image is divided into many horizontal sections. The size of the structuring element is constant inside each of these sections. An opening followed by a closing morphological operation 202c is then applied to concatenate the close blobs, to remove small blobs, and to smooth the boundaries.

Figure 4:
FIG. 4 is a sample image after the morphological operations.

FIG. 4 shows the output of the morphological operations on an image. We can guess a white vehicle is at the bottom right of this image. Also, there are still some specular highlights (bright specularities on vehicles), some white lane markings, and the headlights do not always look symmetrical.

Figure 5:
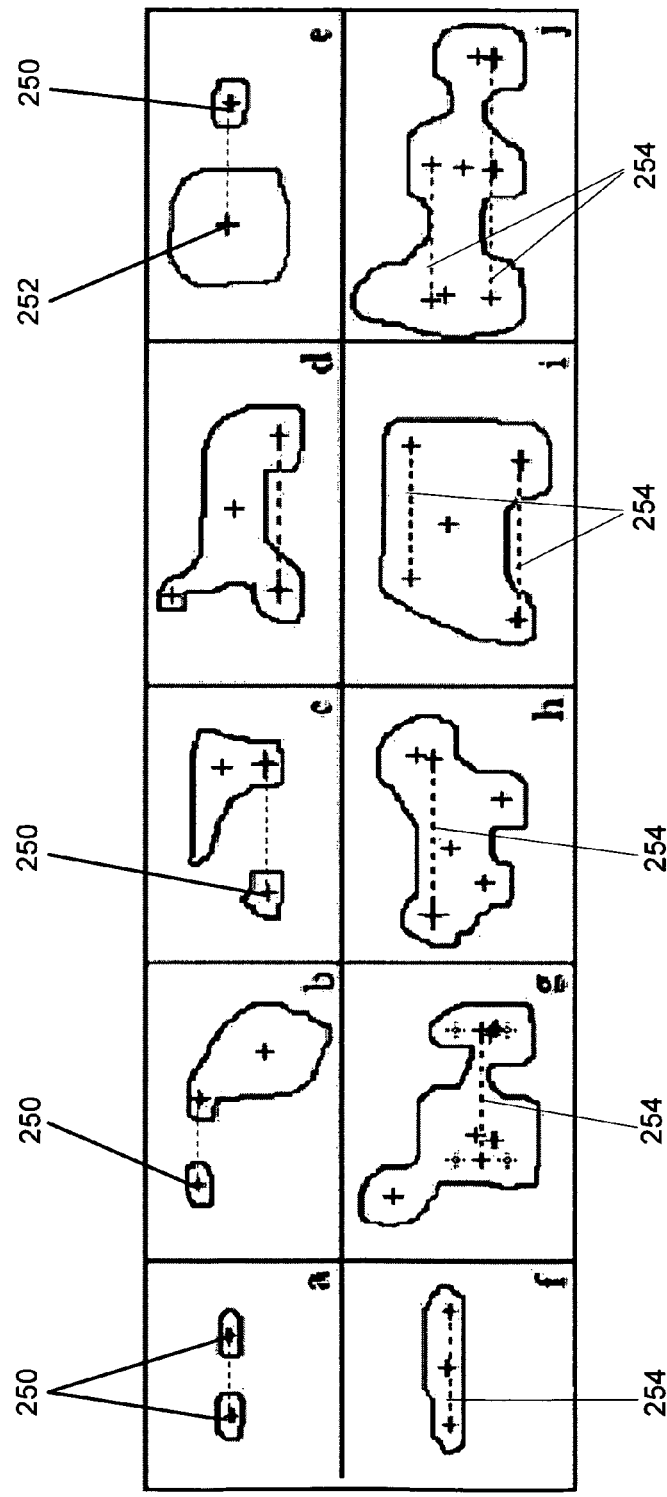
FIG. 5 shows the types of bright blobs (i.e. masses) that can be detected in an image in this example.

FIG. 5 summarises the different types of blobs contours that can be identified in an image. While most of the blobs are similar to the case 'a' on unlit roads, it is not the case for lighted roads.

The case 'b' represents a headlight on the right that is attached to its beam. Cases 'c', 'd', and 'i' are headlights attached to the bonnet of the vehicle. Case 'e' has a headlight on the left that has dazzled the camera.

In the cases 'd', 'f', 'g', 'h', 'i', and 'j' a pair of headlights belonging to the same vehicle is contained in one blob. A combination of the above cases is encountered in cases 'h' and 'j'.

An analysis of each blob is necessary to generate the possible locations of headlights, shown as crosses within the blobs of FIG. 5. The blobs analysis begins by comparing 202*d* the blob area with the area of a typical headlight. The area of a typical headlight is determined during the initialisation by the homographic matrix. After thresholding the area ratios, the blob can be considered too small, normal, or too large.

In the small case, the blob is rejected 202*e*.

In the 'normal' case, we generate a headlight hypothesis at its centroid. These crosses are marked 250 for cases 'a', 'b', 'c' and 'e' 202*f*.

In the large case, we further the analysis 202*g* as follows. The large blob can look like a regular-shaped disc (i.e. circular) and this happens when a headlight dazzles the camera (left headlight in case 'e'). The shape of the large blobs are determined based on its 'shape factor' property and for those that are a regular-shaped disc one hypothesis 252 is generated at its centroid.

Otherwise, using morphological operation we erode the large blob and we generate hypotheses at the centroids of the ultimate erosions. This step takes a mass of pixels and progressively erodes that mass. If the successive erosions result in splitting the original mass in many smaller masses, the centers of these small masses are candidates of headlights. These are the remaining crosses in FIG. 5 not marked 250 or 252 and include hypotheses that are incorrect. Then, assuming the two headlights of a same vehicle are aligned horizontally on the image plane, we look for the mostly separated possible pair at the top and at the bottom of the large blobs. These generated pair hypotheses 202*h* are shown in FIG. 5 as two crosses connected by a dashed line 254.

Of course, steps 202*e*, 202*f* and 202*g* can be performed linearly or in parallel.

The next and last step consists of pairing 202*h* all the generated single crosses (headlight hypotheses) in the current frame to detect the remaining pairs. We scan each cross and we look for two other crosses aligned laterally on the right: one that is separated by 1 m for the cars and another one that is separated by 1.5 m for heavy vehicles. If there are crosses at both distances, two hypotheses are generated. The width between two headlights is pre-computed by the homographic matrix in the initialisation phase. We allow a margin in this distance to accommodate with the calibration errors and the variety of vehicles' widths.

So far, we have generated many hypotheses of pairs of headlights which are in fact the hypotheses of the frontal position and width of vehicles. Now verification 902 of the pairs is performed to determine whether the candidate vehicle is in fact a vehicle represented in the image. Each headlight pair hypothesis contains the headlights' positions hlR, hlL, the estimated headlights diameter hlD and the headlights separation distance hlS=|hlR−hlL| (see FIG. 2). All these measures are converted into world coordinates.

For each hypothesis, we automatically identify 400*i* a sub-image S that can be "cropped out" of the image and square in shape. The size of the square images are simply (hlS+hlD)$^2$ Its bottom-left corner position is hlL−hlD for both image column and row.

Figure 6:
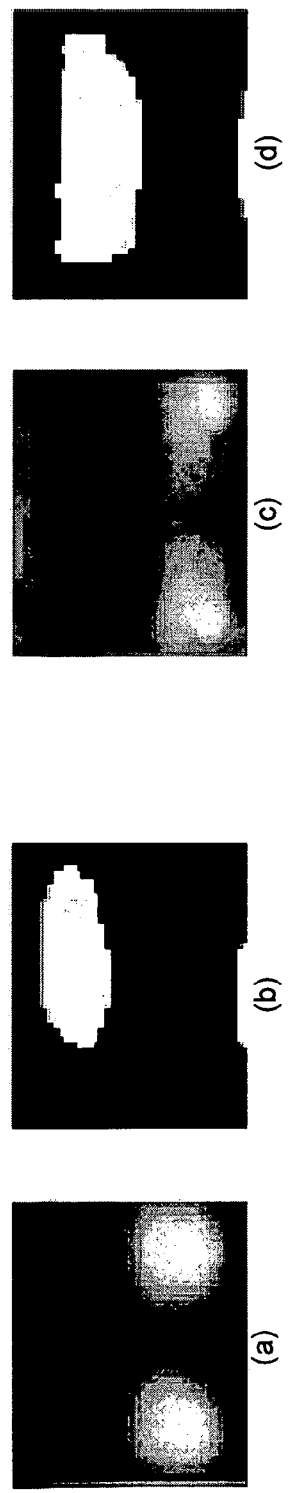
FIG. 6(a) shows an average image of a car and FIG. 6(b) shows the mask image used for a car.
FIG. 6(c) shows an average image of a heavy vehicle and FIG. 6(d) shows the mask image used for a heavy vehicle.

The square images are all scaled to a common size before undergoing histogram remapping methods such as histogram equalisation 400*j*. Histogram equalisation operation compensates for differences in the camera's output gains, as well as improving the contrast. Indeed, it makes the headlights look brighter, the windows darker and the hood more gray. FIG. 6(*a*) shows the average cropped image of a set of true car headlight pair hypotheses and FIG. 6(*b*) shows the average cropped image of a set of true heavy vehicles (trucks, coaches, buses) headlight pair hypotheses. The type of the vehicle is known from the a priori widths between two headlights. In this example:

$$t = \begin{cases} \text{'car'} & \text{if } 0.6 < hlS <= 1.45 \text{ m} \\ \text{'heavyvehicle'} & \text{if } 1.45 < hlS <= 2.5 \text{ m} \end{cases} \quad (10)$$

Figure 7:
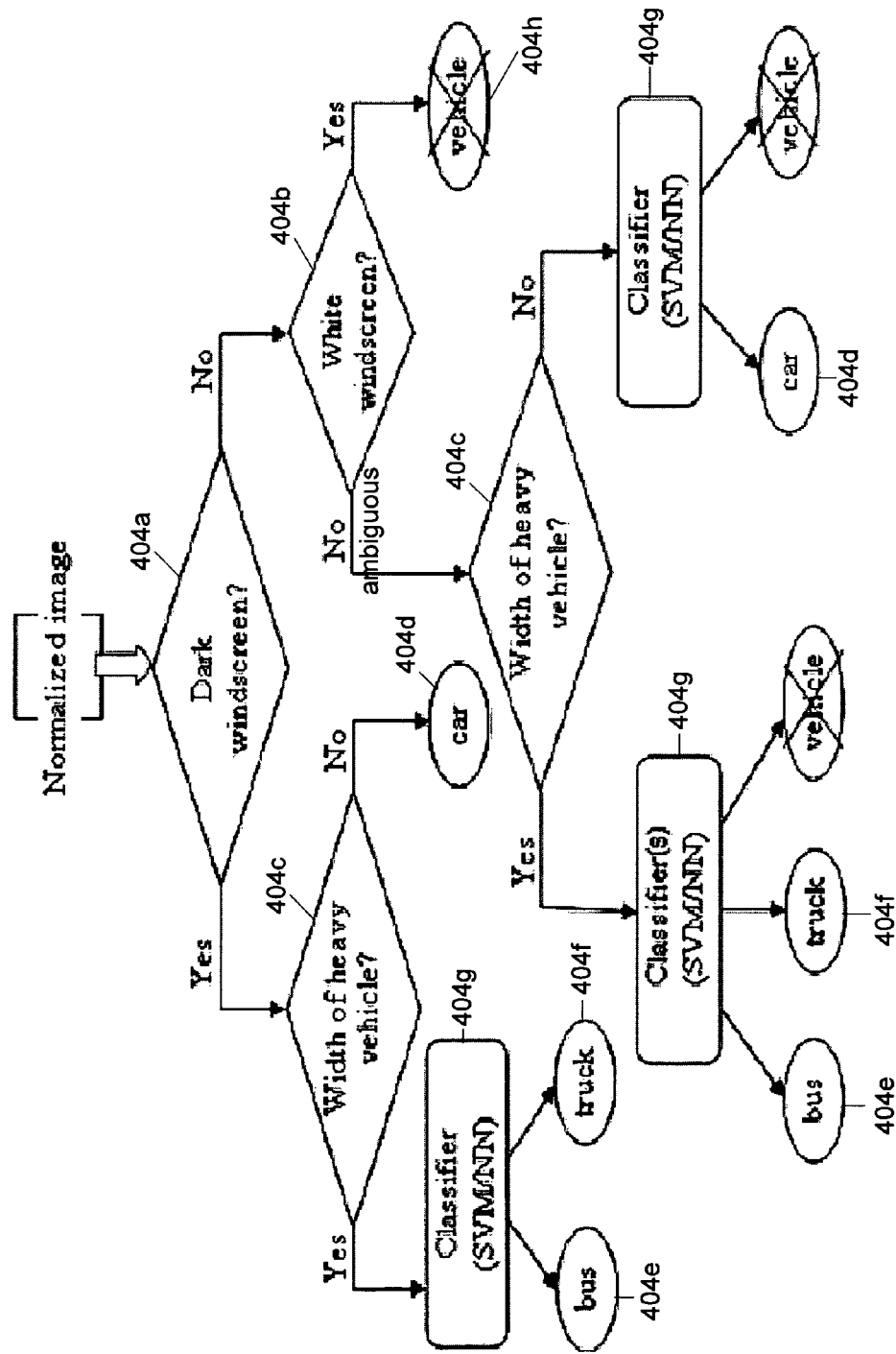
FIG. 7 is a flow diagram of the decision tree used in verification in this example.

The set of square images and with the vehicle type S,t, identified from the current camera frame, are input in a decision tree 400*k*. The decision tree is shown in further detail in FIG. 7 and is used to verify and classify the hypotheses. The average images of FIGS. 6(*a*) and 6(*c*) tells us that a vehicle is mostly represented by a dark windscreen and two bright headlights. Therefore, we check the presence of a true dark windscreen on S 400*a* and a false white windscreen 404*b*. Indeed, a windscreen generally appears dark at night-time and never appears white. The detection of a dark windscreen helps ensure the candidate pairs are kept and checking for white windscreen helps ensure that some false positive candidates 404*h* are removed.

The windscreen detection is very simple and fast. We have two masks of windscreen positions. The masks have the same size as the cropped image S. One mask shows the windscreen of average car FIG. 6(*b*) and the other shows the windscreen of average heavy vehicle FIG. 6(*d*). The mask image corresponding to vehicle type t is multiplied by the image S. The median value of the resulting pixels (i.e. pixels found at windscreen position) is calculated and compared with a 'floor' threshold. The median value performs better than the mean because small highlights on the windscreen affect more the mean value than the median. The floor threshold is obtained from a training set of vehicle and non-vehicles images in such way that there are preferably no false positives. The windscreen detection is also efficient for non-lightened roads. Indeed, a vehicle is detected when the region above the candidate pairs of headlights is dark. If it's not, it is very likely that the hypothesis represents a reflection on the ground instead of a pair of headlights.

Almost half of the non-vehicle training set are white images (e.g. reflections of lights, hood of white vehicles). Therefore, a 'ceil' threshold is also calculated. This 'ceil' threshold corresponds to the maximum value that the median of windscreen pixels can have. If the median value is higher than this 'ceil' threshold, the pixels on windscreen position are white. Therefore we consider that there is no windscreen on the image S and it thereby does not represent a vehicle. The 'ceil' threshold is calculated in such way that there are no image of vehicles rejected in the training sets.

Next, the distance 404*c* between the headlights of a candidate pair is used to classify the candidate pair as belonging to a vehicle that is a car 404*d*, bus 404*e* or truck 404*f*.

Figure 8:
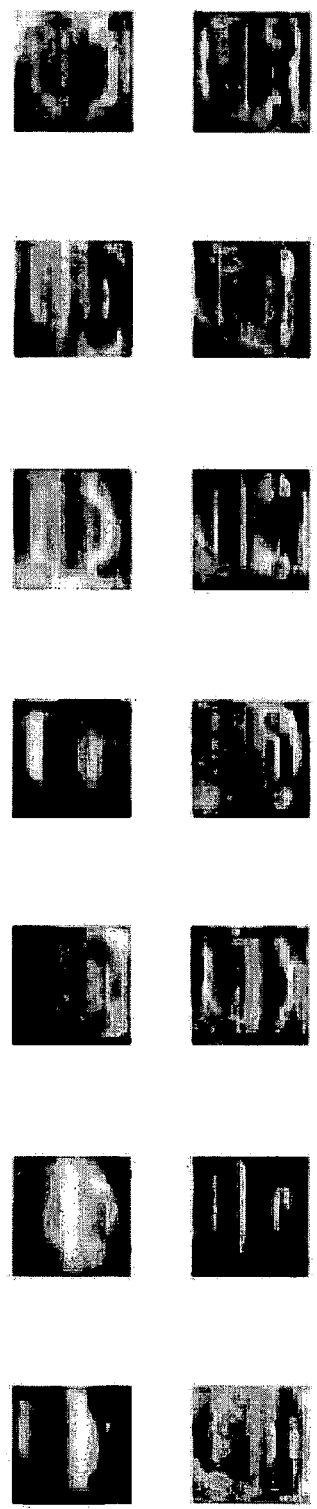
FIG. 8 shows the first 14 'eigencars' determined for use in this example.

For the remaining, ambiguous images, that have not been classified from the two previous simple classifiers based on dark and white windscreen detection, we let a machine learning technique 404*g* make the decision. In this example three machine learning classifiers 404*g* are used that each must be trained. The same method as Turk and Pentland [3]'s one for face detection is used. The descriptors (i.e. eigenvectors) of the cars' training set are named 'eigencars' and the eigenvectors of heavy-vehicles (trucks, buses and coaches) training set 'eigenHVeh' 404*c*. They are calculated using principle components analysis (PCA). Only the most significant descriptors (i.e. eigenvectors) are kept as test descriptors. They have the highest eigenvalues. A characterisation function assists us to choose the number of eigenvectors to keep:

$$\operatorname{argmin}_K \left( \frac{\sum_{i=1}^{K} \lambda_i}{\sum_{i=1}^{N} \lambda_i} \geq P \right), \quad (11)$$

where K is the number of eigenvectors to keep, N is the total number of eigenvectors, $\lambda_i$ are the eigenvalues, and P can be thought as a percentage of vehicle appearance enclosed in the firsts K eigenvectors (we chose P=85%). FIG. 8 shows the 14 first eigencars. The eigencars and eigenHVeh are multiplied by the candidate images S to obtain a feature vector. The feature vector has the same dimension as the number of eigencars or eigenHVeh. The machine learning modules 404*d* are trained by the feature vectors calculated from the images in the training sets.

Both Artificial Neural Networks (ANN) and Support Vector Machines (SVM) have been tested, with a Radial Basis Function (Gaussian kernel). AdaBoost classifier, where the input (descriptor) is the sub-image itself can also be used. There is one module to discriminate the cars from the non-vehicles and another one to discriminate the heavy vehicles from the non-vehicle. Another (optional) module has been trained to separate the heavy vehicles between trucks and buses. The comparison between ANN and SVM for this application is discussed below Highlevel Vehicle Tracking 500

The vehicle detection system can be improved by taking advantage of the temporal continuity between the successive images in the sequence of the captured video. We use here a feature-based tracker which tracks lines. Each line is represented the middle point between the headlights hlM, its length hlS (both in world coordinates), and the vehicle type t (see FIG. 2). A simple Kalman filter is incorporated into the system as a prediction mechanism. From the whole set of tracked lines, some are considered as belonging to a vehicle, while some may not be. Each tracked line has thus a flag which can take two values: 'vehicle' or 'uncertain'. The initial flag for a new tracked object is 'uncertain'.

We have divided the tracking system into four modules. One module focuses on the matching problem. Its first input is all the observed lines from the hypotheses that were not discarded by the decision tree. Only vehicles of the same type t are matched together. The other input is the set of the Kalman-predicted lines with their flag. The matching criterion is the minimum Euclidean distance between a tracked line and an observed line inside a rectangle matching window. The window dimensions in meters are determined using a priories on vehicles' dimensions and maximum speed. We use the flag as a priority to match at first the objects which are considered as vehicles. Then, we match the remaining observed lines with the 'uncertain' tracked objects. Finally, the observed lines which have no match constitute new entries and initialise new 'uncertain' tracked objects.

The second module is the occlusion reasoning module 502. It tries to find a measure for the tracked objects that did not get one during the matching process. The first attempt looks for a line that were discarded by the decision tree, but that could nevertheless be matched (after constraining the rectangle matching window). This line should therefore be a false negative. The second attempt assumes one headlight is occluded and try to find the non-occluded one. This headlight is located on the left or on the right of the tracked position, distanced by half of the length of the line. Lastly, if the tracked object is getting very close to the vehicle ahead in the same lane, we stop its speed and acceleration, assuming it's totally occluded.

The third module is the Kalman filter. It takes as input the result of the matching and occlusion reasoning modules to estimate the updated state of the tracked objects. The state includes the line's middle position, the line's length, the speed and its acceleration. All these parameters are in world coordinates. Only the position and the speed will be useful for traffic data extraction. However, the line length is used to make the matching more reliable. The acceleration improves the prediction of the speed and the position of the vehicle in case there are no more measurement. If a tracked object did not get a measurement from the two previous modules, we just keep the predicted state.

The last module has the responsibility to change the flag or to kill the tracked objects. It is composed of simple but efficient rules. An object can be killed if it gets out of the image boundaries, or if it has been flagged 'uncertain' for a too long time. An object is declared as 'uncertain' at its creation and becomes 'vehicle' after a certain number of frames. If we have lost measurements for a certain period of time, the object comes back to 'uncertain', etc. . . .

The output 504 of the tracking system is a list of positions and speeds from the 'vehicle' flagged objects. The list is used to build statistic about the traffic scene. From this, traffic data can be extracted including useful traffic parameters per lane, the number of vehicles, the average speed, the stopped lanes' waiting time, the traffic flow. Further, for each vehicle the position, classification (car/bus/truck), speed estimation, waiting time if stopped and lane changes. If performed in real-time the vehicles with low or nil speed can trigger an alarm on high speed roads for incident detection. Also, abnormal events can be detected, such as non-vehicle detection on a highway.

Figure 9:
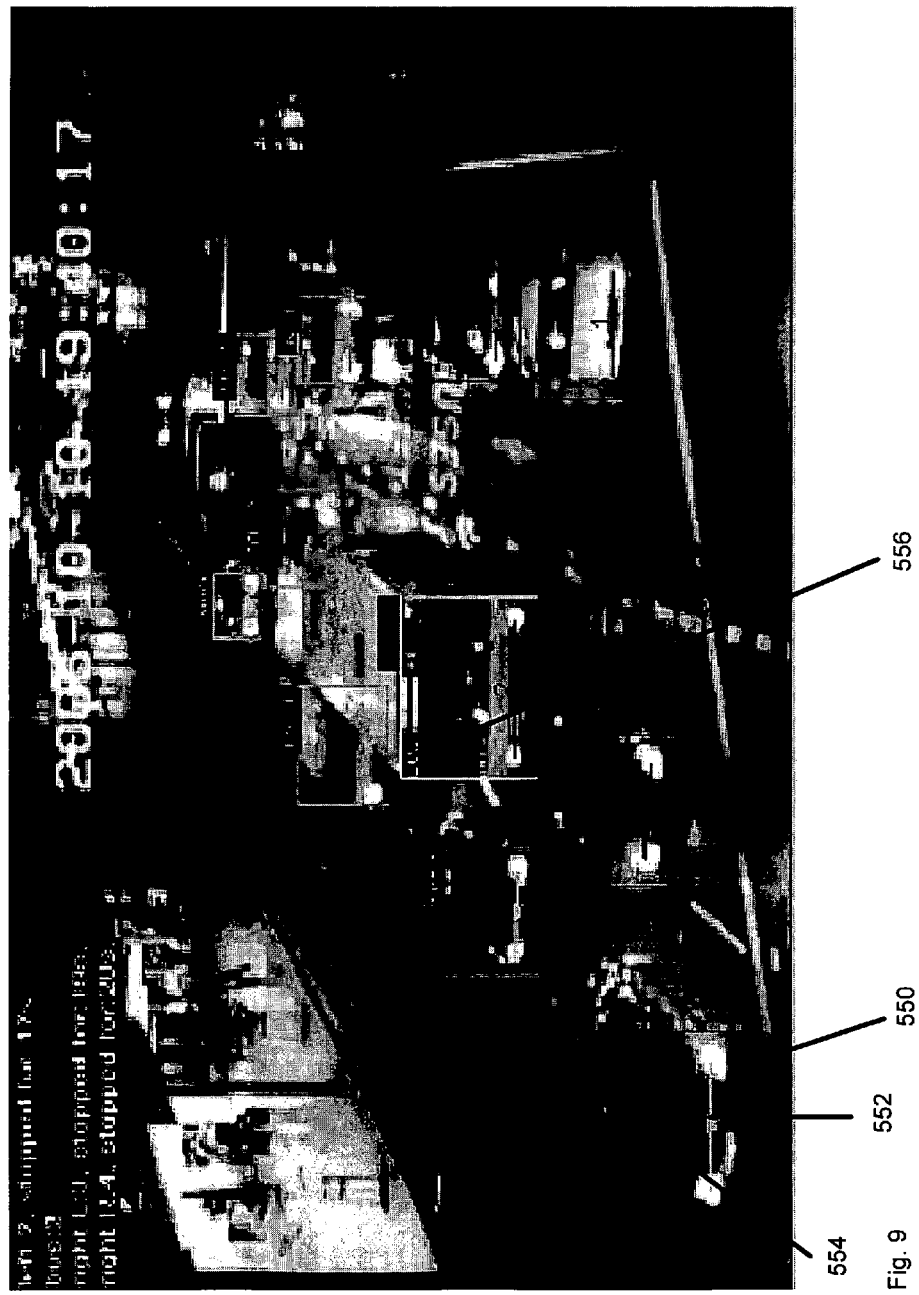
FIG. 9 is sample image showing traffic data extracted from the image using the vehicle detection method of this example.

An example of an image processed by the traffic surveillance system discussed here is shown in FIG. 9. Each detected vehicle is shown in the image as being bounded by a box, one example is indicated at 550. The colour (not shown) of each box shows the current speed of the respective vehicle. In this case a green box identifies that the vehicle is moving and a red box indicates that the vehicle has stopped. An indication of the vehicles' current speed is also shown at the top right of the box, the word 'stopped' is displayed at 554. If the vehicle is classified as a heavy vehicle this is also shown within the box, for example the label 'bus' at 556.

Advantages of the example of the invention described here includes:
- method is camera exposure agnostic
- reducing the frequency at which white and light coloured vehicles are not detected
- can be successfully applied to both lighted and unlighted roads
- it does not rely on the assumption of a strong contrast between a headlight and its surroundings in an image
- false positives are reduced by disregarding headlight hypotheses that are later discovered to be for instance headlight's reflection, or headlights of two different vehicles laterally aligned
- does not rely on the use of multiple cameras to capture the one scene or use of a thermal camera that would increase the cost of the system. Can be used with medium to low mounted cameras, such as 4 m to 15 m high
- there is very low reliance on manual thresholds. In this way the example can be applied to alternate scenes without needing to manually tune the new thresholds. This makes the example applicable to many scenes and reduces the complexity and therefore cost of installation
- by tracking the detected vehicles the method is able to better deal with the partial/total occlusions, vehicle moving or stopped.
- is robust to different conditions such as dawn, dusk, night, low/medium/high traffic flow, raining and windy conditions
- can be performed in real-time or off line
- once trained, the same ANNs (or SVMs or boosting methods) are used for any roads. This makes the system generic, scalable and easy to install It will be appreciated by persons skilled in the art that numerous variations and/or modifications may be made to the invention as shown in the specific embodiments without departing from the scope of the invention as broadly described.

For example, reducing the number of false negatives by intensifying the incremental tracking, such as through a temporal analysis of the appearance of the tracked objects (e.g. by their eigenweights).

Where the images are processed in real-time, the system may be embedded in the camera, so that the computer 610 is directly connected to the camera 600 and the method described here is performed by the computer 610. This avoids the need for image compression and ensures that only the traffic information is sent over the network.

The method may be used in conjunction with other detection and/or tracking techniques.

The present embodiments are, therefore, to be considered in all respects as illustrative and not restrictive.

REFERENCES

[1] R. Cucchiara, M. Piccardi, and P. Mello. Image analysis and rule-based reasoning for traffic monitoring system. *Intelligent Transportation Systems, IEEE Transactions on*, 1(2):119-130, June 2000. 2, 4
[2] D. Dailey and F. 1 Cathey. Cctv technical report—phase 3. Technical report, Washington State Transportation Center (TRAC), 2006. 3
[3] T. M. and A. Pentland. Eigen faces for recognition. *Journal of Cognitive Neuroscience, vol.* 3:pp. 71-86, 1991. 6
[4] R. taktak, M. Dufaut, and R. Husson. Vehicle detection at night using image processing and pattern recognition. In *Image Processing, 1994. Proceedings. ICIP-94., IEEE International Conference*, volume 2, pages 296-300 vol. 2, 13-16 Nov. 1994. 2, 4

Claims defining the invention are as follows:

1. A method of detecting a vehicle represented in an image of a night time scene, the method comprising the steps of:
    (a) identifying a candidate pair of headlights in an image based on luminance of points in the image;
    (b) identifying a sub-image of the image sized to include a candidate vehicle having the pair of candidate headlights; and
    (c) determining whether the candidate vehicle is a vehicle represented in the image by testing the sub-image for the presence of predetermined features of a vehicle other than the headlights.

2. The method according to claim 1, wherein the step of identifying a pair of candidate headlights comprises identifying a mass of neighboring points in the image as including a candidate headlight such that the points of the mass have predetermined luminance values.

3. The method according to claim 2, wherein identifying a pair of candidate headlights comprises estimating a location of a candidate headlight in a mass.

4. The method according to claim 2, wherein if the mass is larger than a predetermined size, the method further comprises the step of estimating the location of two candidate headlights to form a pair of candidate headlights, the two locations being the most separated locations within the mass that are laterally aligned.

5. The method according to claim 1 wherein the sub-image is sized and shaped to substantially include only a representation of the candidate vehicle.

6. The method according to claim 1, wherein the size of the sub-image is based on the position and length between the pair of candidate headlights.

7. The method according to claim 1, wherein the method further comprise the step of scaling the sub-image to a predetermined size.

8. The method according to claim 1, wherein the predetermined feature of step (c) includes at least one part of the vehicle.

9. The method according to claim 1, wherein testing the sub-image for the presence of the predetermined feature comprises determining whether the predetermined feature is a predetermined spatial relationship with the candidate headlights.

10. The method according to claim 1, wherein the step of testing the sub-image for the presence of the predetermined feature comprises applying a mask to the sub-image that outlines the predetermined feature to determine whether points having a predetermined characteristic are located in the sub-image within the outline of the predetermined feature.

11. The method according to claim 1, wherein the predetermined feature is the appearance of the vehicle in the sub-image.

12. The method according to claim 1, wherein step (c) comprises:
    determining one or more descriptors to represent a sub-image; and
    testing the one or more descriptors on a trained classifier to determine whether the candidate vehicle of the sub-image is a vehicle represented in the image.

13. The method according to claim 1, wherein the image of the night time scene is one image in a time ordered sequence of images that the method is performed, and the method further comprises matching the detected vehicle in subsequent images of the sequence.

14. The method according to claim 1, wherein the method further comprises the step of classifying the detected vehicle.

15. The method according to claim 14, wherein classifying the detected vehicle comprises determining the distance between the headlights of the identified pair of headlights of the detected vehicle.

16. The method according to claim 14, wherein classifying the detected vehicle comprises:

determining one or more descriptors to represent a sub-image; and testing the one or more descriptors on a trained classifier to classify the vehicle using machine learning techniques.

17. The method according to claim 1, wherein the method further comprises the initial step of identifying lanes in the image, and performing the method on the area of the image bounded by a vertical distance in the image above the identified lane.

18. The method according to claim 1, wherein the method further comprises the step of extracting traffic information about the detected vehicle from the image.

19. The method according to claim 1, wherein the method comprises the step of translating all points in an image from image coordinate values to a real world values.

20. A computer for detecting a vehicle represented in an image of a night time scene, the computer comprising:

input means to receive the image of the night time scene;

a processor to (a) identify a candidate pair of headlights in the image based on luminance of points in the image, (b) identify a sub-image of the image sized to include a candidate vehicle having the pair of candidate headlights, and (c) to determine whether the candidate vehicle is a vehicle represented in the image by testing the sub-image for the presence of predetermined features of a vehicle other than the headlights; and output means to indicate whether a vehicle has been detected in the image.

\* \* \* \* \*